United States Patent [19]
Behrens

[11] Patent Number: 4,611,714
[45] Date of Patent: Sep. 16, 1986

[54] CONNECTING SYSTEM

[76] Inventor: Ronald L. Behrens, 1937 Warren Ave., #201 (III), Longmont, Colo. 80501

[21] Appl. No.: 715,284

[22] Filed: Mar. 25, 1985

[51] Int. Cl.⁴ .......................................... B65D 85/672
[52] U.S. Cl. .................................... 206/387; 206/806; 220/375
[58] Field of Search ...................... 24/1, 3 R; 206/387, 206/806; 220/85 R, 375; 215/100 R, 306; 248/317, 318

[56] References Cited

U.S. PATENT DOCUMENTS

| | | | |
|---|---|---|---|
| 2,601,017 | 6/1952 | Herrick | 220/375 |
| 2,854,789 | 10/1958 | Berry | 220/375 |
| 2,871,902 | 2/1959 | Weil | 206/38.1 |
| 3,318,354 | 5/1967 | Borisof | 206/38.1 |
| 3,823,814 | 7/1974 | Lum | 206/387 |
| 4,194,657 | 3/1980 | Thor | 220/375 |
| 4,327,960 | 5/1982 | Gould | 220/375 |
| 4,330,161 | 5/1982 | Khawand | 206/387 |
| 4,375,850 | 3/1983 | Smyth et al. | 206/387 |
| 4,418,733 | 12/1983 | Kallman | 206/806 |
| 4,432,120 | 2/1984 | Sherman, Jr. et al. | 220/375 |
| 4,512,469 | 4/1985 | West | 206/387 |

FOREIGN PATENT DOCUMENTS

1632554 9/1969 Fed. Rep. of Germany ..... 206/37.1

*Primary Examiner*—William Price
*Assistant Examiner*—Jimmy G. Foster
*Attorney, Agent, or Firm*—Dean P. Edmundson

[57] ABSTRACT

A system is described for securing or connecting a recording tape cassette to a storage case for the cassette. A length of flexible cord is fastened at one end to the tape cassette and at its opposite end to the storage case. If desired, the storage case may remain connected to the tape cassette even when the cassette is being played. The flexible cord is adapted to be enclosed within the storage case when the cassette is placed therein for storage.

15 Claims, 4 Drawing Figures

CONNECTING SYSTEM

FIELD OF THE INVENTION

This invention relates to recording tape cassettes. More particularly, this invention relates to recording tape cassettes and storage cases for such cassettes.

BACKGROUND OF THE INVENTION

Recording tape cassettes have become extremely popular over the past few years. They have also become extremely popular for use in tape players in automobiles.

One common irritation associated with the use of tape cassettes in automobiles is that the storage cases for the tape cassettes are too easily lost or misplaced when the tapes are taken out of the cases to be played. Another problem which is sometimes encountered is that the storage cases may clutter the dash or the seats of the vehicle if they are not put safely away. The storage cases may also become broken or damaged. Further, tape cassettes may be put into the wrong storage cases. Worse yet, the storage cases may not be used at all if they aren't readily accessible when a tape cassette is taken out of the player. Then the tape cassette can become dirty or damaged.

SUMMARY OF THE INVENTION

The present invention provides a system for securing or connecting a recording tape cassette to a storage case. This prevents the storage case from being lost or misplaced or broken when the tape cassette is being used.

The system of the invention comprises a length of flexible cord which is fastened at one end to the tape cassette and is fastened at its opposite end to the storage case. The cord is fastened to the tape cassette in a manner such that the cord is also adapted to be enclosed within the storage case when the cassette is placed therein.

With the connecting system of the present invention, the storage case is prevented from becoming separated from the tape cassette even when the tape cassette is being played. Then when the tape cassette is removed from the player, it is very convenient to place the tape cassette back into the storage case. Since there is no need to search for the appropriate storage case, the system of the invention encourages the user to place the tape cassette back into the proper storage case. This, of course, protects the tape cassette from dust and possible damage. Since the storage case remains connected to the tape cassette, the storage case does not become lost nor does it clutter the dash, the seats, or the floor of the vehicle.

BRIEF DESCRIPTION OF THE DRAWINGS

The invention is described in more detail hereinafter with reference to the accompanying drawings wherein like reference characters refer to the same parts throughout the several views and in which.

DETAILED DESCRIPTION OF THE INVENTION

Figure 1:
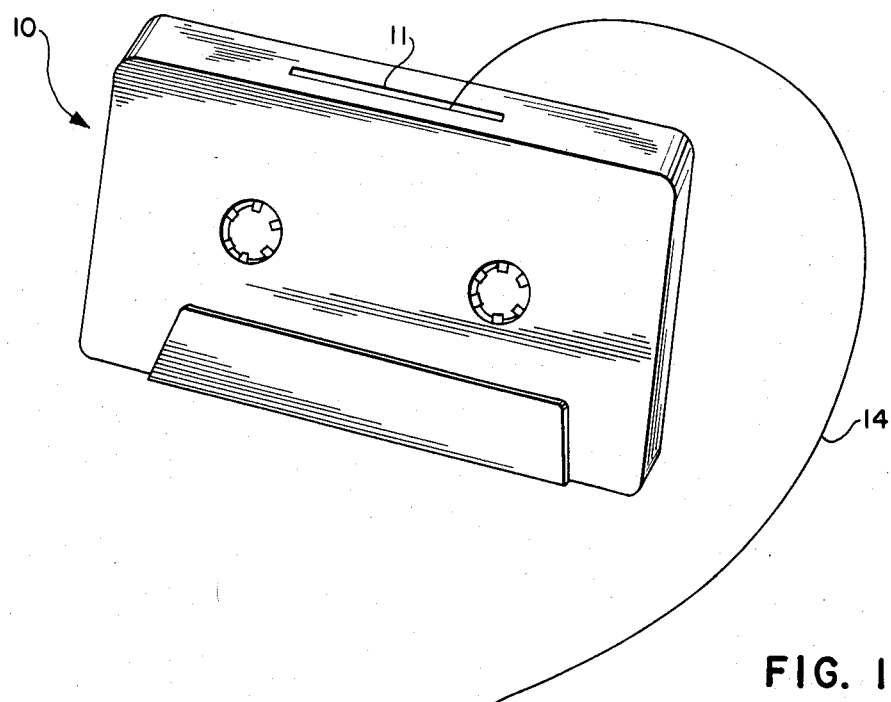
FIG. 1 is a perspective view of one embodiment of the invention.
Figure 1:
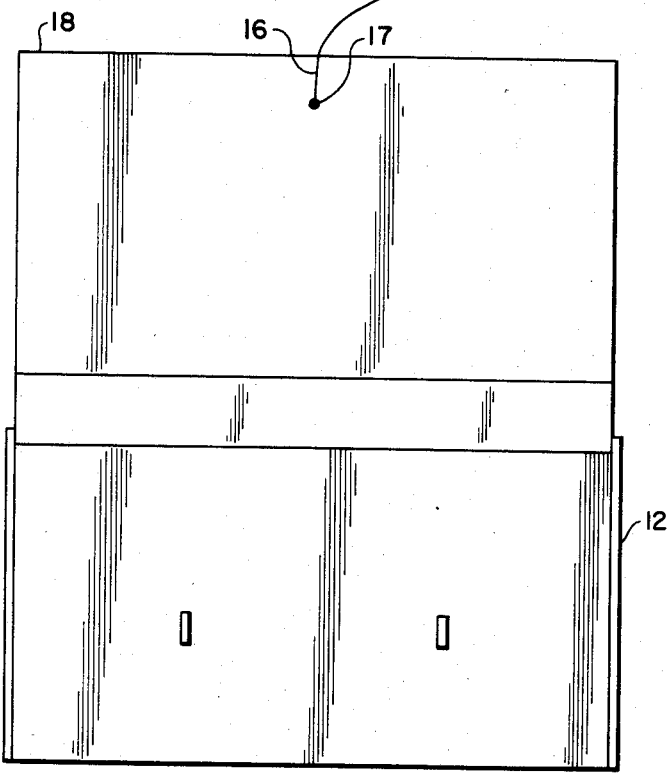
Figure 2:
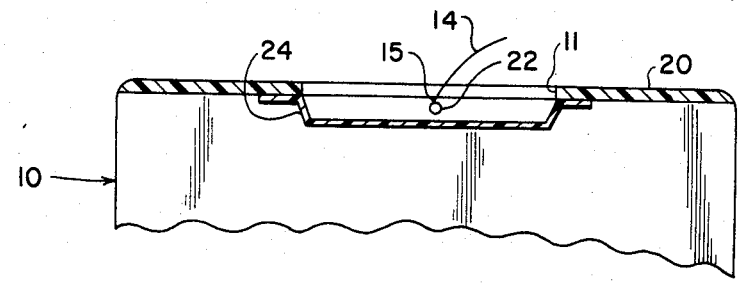
FIG. 2 is a cross-sectional view of a portion of the tape cassette of FIG. 1.

In FIGS. 1 and 2 there is shown an embodiment of the invention in which recording tape cassette 10 is connected to storage case 12 by means of flexible cord 14. One end 15 is connected to tape cassette 10 and the opposite end 16 of flexible cord 14 is connected to storage case 12. End 16 of cord 14 is preferably securely and firmly fastened to the inside surface of the hinged cover 18 of storage case 12. It may be secured thereto, for example, by means of adhesive 17 or a mechanical fastener, if desired. Whatever means are used to secure the flexible cord to the storage case, such means should be relatively thin so as not to project into the interior of the storage case in a manner which would interfere with placement or storage of the tape cassette therein.

End 15 may be secured to the tape cassette 10 in the manner illustrated in FIGS. 1 and 2. As shown, end 15 extends through aperture 11 in the back edge 20 of cassette 10 opposite from the edge at which the recording tape is exposed. At the end 15 of cord 14, below aperture 11, there is secured a clip 22 or other similar item which is large enough to prevent passage through aperture 11.

Aperture 11 is a long slot (e.g., about 1 to 2 inches long) which is slightly wider than the diameter of the end 15 of cord 14 so that cord 14 may slide therealong without binding. This enables the tape cassette to be inserted into a tape player and played without interference of the cord with insertion of the tape cassette into the player and without interference during playing. The presence of the elongated slot enables the cord to be moved to one end or the other so that when the tape cassette is placed in a tape player the cord is near the outward end of the cassette. This minimizes the opportunity for any possible interference of the cord with the player.

To prevent dust from entering the tape cassette through aperture 11 there is preferably a strip 24 of sealing material covering the underside of aperture 11, as shown. Strip 24 may be secured in the desired position by adhesive or tape, for example. Strip 24 may be made of any material which is non-magnetic and which is capable of preventing dust and dirt from entering the tape cassette. For example, it may be made of felt, paper, plastic, metal or other suitable material. It is also possible to mold the sealing strip as an integral part of the tape cassette at the factory during the production of the tape cassette.

The storage case is typically made of plastic. Although the storage case illustrated in the drawings is of a particular style having a hinged cover 18 to which end 16 of flexible cord 14 is secured, the storage case could be of other designs also.

The flexible cord 14 may be made of plastic line (e.g., nylon fishing line or the like), wire, chain, or cable, for example, or various other materials. Typically the cord will be thin (e.g., about 0.005 to 0.015 inch or so, more preferably 0.009 to 0.013 inch). It is also possible to use a two piece cord which could be temporarily separated (e.g., if it was necessary or desirable to substitute a tape cassette or storage case). For example, a conventional fastener could be used to hold the two portions of the cord together. It is also possible to provide one or both of the ends of cord 14 with a releasable fastener so that it can be entirely disconnected from either the tape cassette or the storage case.

Figure 4:
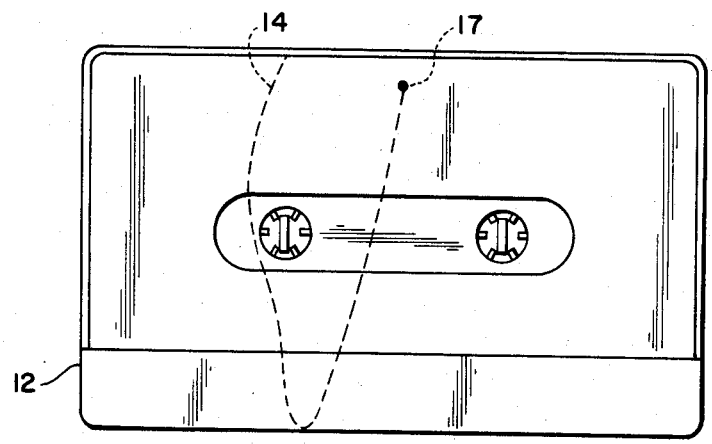
FIG. 4 illustrates one manner in which the connecting means is stored in the storage case with the tape cassette.

The length of the cord 14 is normally about 6 inches so that it will be entirely enclosed within the storage case 12 when the tape cassette 10 is placed therein for storage (as shown in FIG. 4 where cord 14 extends up one side of the cassette and down the opposite side in the storage case).

Figure 3:
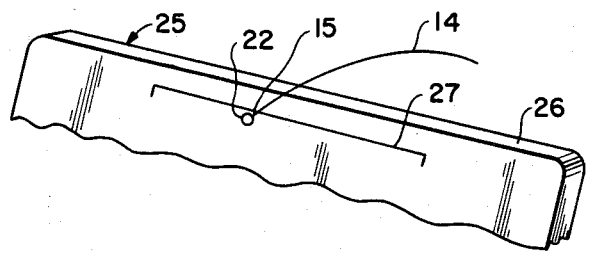
FIG. 3 is a perspective view of another embodiment of the invention.

In FIG. 3 there is illustrated another embodiment of the system of the invention in which there is used an alternative means for connecting the cord 14 to tape cassette 25. Thus, there is shown a means for connecting cord 14 to the exterior of tape cassette 25 near the back edge 26 thereof. Both ends of an elongated wire 27 are securely fastened to one face of tape cassette 25. A thin elongated slot or track is defined between wire 27 and tape cassette 25. End 15 of cord 14 passes between the wire 27 and the face of cassette 25 and then is fitted with a clip 22 or other fastener which is larger than the depth of the slot or track defined by the wire 27 and the cassette 25. The clip 22 thus assures that end 15 of cord 14 is captured. Core 14 may slide back and forth along the length of wire 27, as required. The distance between the wire 27 and the face of the cassette (i.e., the depth of the gap) is preferably no greater than about 0.020 inch.

Another variation of the invention for attachment of the cord 14 to the tape cassette includes securing to one face of the tape cassette a thin strip (e.g., a plastic strip) which has a slot therein. One end of the cord is passed through the slot and captured (much in the same manner as shown in FIG. 2). Preferably the thickness of the strip is no greater than about 0.020 inch. The strip could, of course, be made of metal, if desired. The strip may be conveniently secured to the tape cassette with adhesive, for example, or with a conventional mechanical fastener.

Other variants are possible without departing from the scope of this invention.

What is claimed is:

1. A system for securing a recording tape cassette to a storage case for said cassette, said system comprising a cassette, a storage case and a length of flexible cord for fastening at one end to said cassette and means for fastening at its opposite end to said storage case, wherein said cassette includes a slotted aperture in which one end of said cord is captured in a manner such that said end of said cord may slide along the length of said aperture, wherein said cord does not interfere with the playing of said cassette in a player, and wherein said cord is adapted to be enclosed within said storage case when said cassette is placed therein.

2. A system in accordance with claim 1, wherein said cord comprises a length of cable.

3. A system in accordance with claim 1, wherein said cord comprises a length of nylon line.

4. A system in accordance with claim 1, wherein said flexible cord has a length of about six inches.

5. A system in accordance with claim 1, wherein said storage case is made of plastic.

6. A system in accordance with claim 1, wherein said storage case has a hinged cover.

7. A system in accordance with claim 1, wherein said slotted aperture is located in the back edge of said cassette.

8. A system in accordance with claim 1, wherein said slotted aperture is located on one face of said cassette.

9. A system in accordance with claim 8, wherein said slotted aperture comprises a wire secured to said cassette, wherein said wire defines one side of said aperture, and wherein said face of said cassette defines the opposite side of said aperture.

10. A system in accordance with claim 1, wherein said opposite end of said flexible cord is firmly secured to said storage case.

11. A method for securing a recording tape cassette to a storage case for said cassette, the method comprising the steps of:
 (a) providing a cassette and a slotted aperture in said cassette;
 (b) providing a storage case for said cassette;
 (c) providing a length of flexible cord having first and second ends;
 (d) providing means for attaching said cord to said storage case;
 (e) attaching said first end of said cord in said slotted aperture so that it will slide along the length of said aperture without interrupting the normal playing of said cassette in a tape player;
 (f) attaching said second end of said cord to said storage case by said means so that said cord is enclosed within said case when said case is closed.

12. A method in accordance with claim 11, wherein said slotted aperture is located in the back edge of said cassette.

13. A method in accordance with claim 11, wherein said slotted aperture is located on one face of said cassette.

14. A method in accordance with claim 13, wherein said slotted aperture comprises a wire secured to said cassette, wherein said wire defines one side of said aperture, and wherein said face of said cassette defines the opposite side of said aperture.

15. A method in accordance with claim 11, wherein said storage case has a hinged cover.

* * * * *